United States Patent Office.

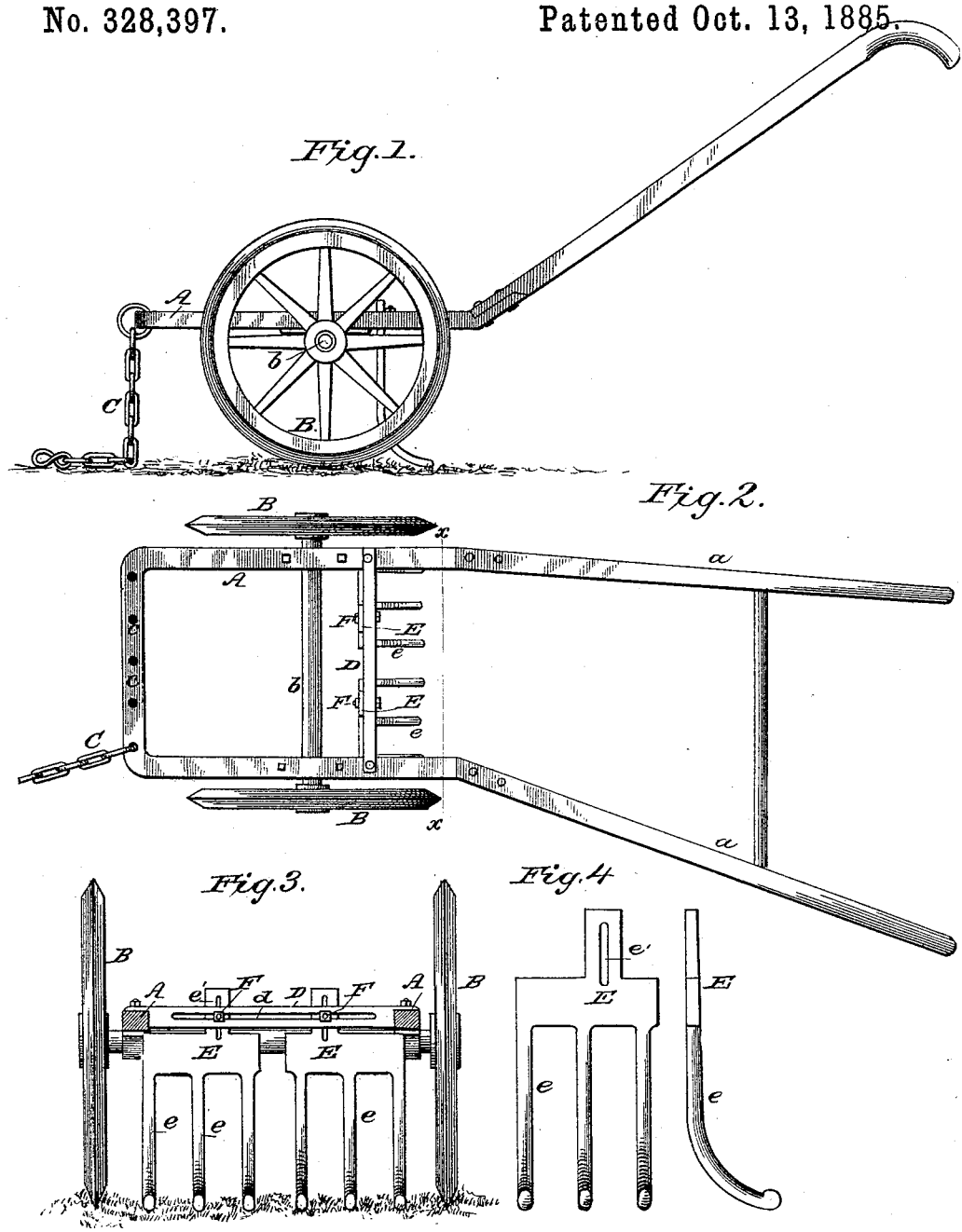

JAMES H. FOWLES, OF ORANGEBURG COURT-HOUSE, SOUTH CAROLINA.

COTTON-CULTIVATOR.

SPECIFICATION forming part of Letters Patent No. 328,397, dated October 13, 1885.

Application filed April 18, 1885. Serial No. 162,655. (No model.)

*To all whom it may concern:*

Be it known that I, JAMES H. FOWLES, of Orangeburg Court-House, Orangeburg county, in the State of South Carolina, have invented a new and useful Improvement in Cotton-Cultivators; and I do hereby declare the following to be a full, clear, and exact description of the same, reference being had to the accompanying drawings, forming a part of this specification.

My invention relates to cultivators for cotton and other plants in the earlier stages of growth, and has for an object to provide a simple construction which can be cheaply made, and by which a large amount of hoe labor may be dispensed with, and the cultivating-teeth will be held at all times projecting directly to the rear of the framing or carriage.

The invention consists in the detailed combination and construction of the parts hereinafter described.

I will now proceed to describe my invention with reference to the accompanying drawings, in which similar letters of reference indicate corresponding parts.

Figure 1 is a side elevation of my improved cotton-cultivator. Fig. 2 is a plan view of the same. Fig. 3 is a cross-section taken on the line $x$ $x$ in Fig. 2. Fig. 4 is a side view of the two adjustable cultivator-teeth.

A is the framing of the cultivator, provided with handles $a$, which incline to the left, to allow the operator to walk on one side.

B are the cultivator-wheels, made with sharp beveled edges which enter the soil and steady the implement. These wheels run loose upon the axle $b$, which is attached to the framing A.

C is a chain for attaching the cultivator to a horse or other animal, and can be attached to any one of the holes $c$ in the cultivator-frame, as may be necessary.

D is a bar having a longitudinal slot, $d$, situated between the wheels B close behind the axle $b$ and firmly attached to the cultivator-frame A.

E are two adjustable cultivator-teeth, each having the blades $e$ bent backward, and provided with the vertical slots $e'$.

F are bolts, which pass through slots $d$ and $e'$, and clamp the cultivating attachments in any desired position on the bar D.

The cultivator is made to run directly over the seed-furrow before or after the plants appear above ground, breaking the crust formed by rains, and preventing grass from starting, and later, by the use of other forms of cultivator-teeth, not described here on account of having been long in common use, the earth is barred off or thrown to the plants, as desired.

Both the operator and animal walk on one side, and all side draft is prevented by the grip of the beveled wheels.

Having thus described my invention, what I claim as new, and desire to secure by Letters Patent, is—

In a cultivator, the combination of the wheels B, having sharp beveled edges, with the adjustable cultivating attachments E, having teeth bent backward and attached to cross-bar D, between the wheels B, by bolts F, passing through slots $d$ and $e'$, substantially as described and shown, and for the purpose set forth.

The above specification of my invention signed by me in the presence of two subscribing witnesses.

JAMES H. FOWLES.

Witnesses:
 EDWARD N. CHISOLM,
 GEORGE W. SEIGNIOUS.